United States Patent Office 3,718,924
Patented Feb. 27, 1973

3,718,924
ELECTRICAL DEVICE FOR MEASURING AND CONTROLLING THE TEMPERATURE AT A LARGE NUMBER OF POINTS
Georges Trubert, Grenoble, and Jean Louis Droulin, Courbevoie, France, assignors to La Telemecanique Electrique, Nanterre, Hauts-de-Seine, France
Filed Oct. 27, 1970, Ser. No. 84,313
Claims priority, application France, Oct. 27, 1969, 6936715
Int. Cl. G08b 21/00
U.S. Cl. 340—417
10 Claims

ABSTRACT OF THE DISCLOSURE

For the control of temperature on multiple processes, in particular the control of the temperature of threading heads of a textile machine, a device is provided having a multiple Wheatstone bridge in which each control arm comprises a static switching means, the bridge having common set means and being supplied by means of an unidirectional chopped current, means being provided for controlling the conduction angle of the static switching means and, therefore, the rate of heating through a control of the phase difference between the chopped current and the A.C. voltage supply. Alarm means are further provided for signalling the temperature defects, and logic circuits for automatically producing passage from an accelerated to a normal heating, once all the control points have reached a predetermined lower threshold temperature.

In a number of machines or installations it is necessary to check with precision the temperature of a large number of elements and to maintain this temperature at a required or index value to within narrow limits, this required value being identical for all the check or inspection points.

An important application, to which the present invention is not necessarily limited, concerns the control and supervision of the temperature of threads in a textile machine.

This type of problem has been solved in various ways in the prior art.

A conventional solution consists in employing a Wheatstone bridge in the measuring arm of which are inserted, in succession by switching, heat responsive probes which measure the temperature at the different check or measuring points.

This cyclic inspection of the check points has the drawback of requiring complex devices and the complete stoppage of the machine in the event of a defect, which might even be a momentary defect at a single point.

A Wheatstone bridge having multiple measuring arms could of course be employed. However, known devices of this type, in which the bridge is usually of the type including a potentiometer having a D.-C. voltage supply are themselves relatively complex and have numerous drawbacks if it is desired to apply them to the all or nothing regulation of a very large number of heating channels.

In particular, the current absorbed by the defective channel is liable to react on the set or index voltage and usually this interdependence of the measuring and control channels can only be avoided by utilizing a very high index current. Moreover, the amplifiers of the channels have drifts which are difficult to eliminate. Lastly, the control of the electronic switching means that the channels include for cutting off the heating usually require the use of complex circuits having a very high consumption.

The object of the present invention is to avoid these drawbacks.

The invention mainly provides a device for measuring and controlling temperature at a plurality of points, comprising a Wheatstone bridge having a potentiometer arm for setting the index temperature common to the different points and as many measuring arms as there are points, said measuring arms being connected in parallel and each comprising a heat responsive probe connected in series with a resistor, a voltage source for the bridge connected to the terminals of the potentiometer arm and a plurality of control networks each comprising means amplifying the error voltage and a static switching means having a thyratron characteristic adapted to control the heating, said networks being respectively connected between the slider of the potentiometer and the common points of the heat responsive probe with the resistor of the respective measuring arms, wherein said voltage source furnishes a periodic voltage in the form of pulses having a predetermined frequency and phase relation with the voltage supply of the static switching means.

The invention will be better understood from the following description:

In the accompanying drawings

FIG. 1 shows diagrammatically a Wheatstone bridge comprising, on one hand, a potentiometer arm for setting the desired working temperature for the different check points and, on the other hand, as many measuring arms connected to temperature regulating means as there are check points.

Figure 1:
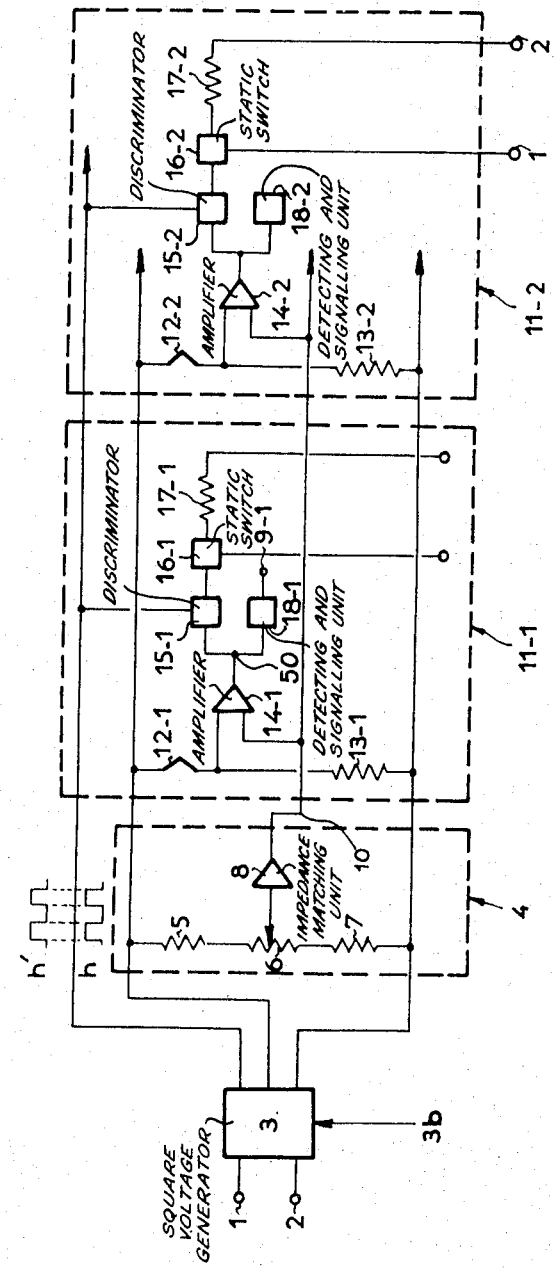
FIG. 1 is a block diagram of a measuring and control device according to the invention.

For reasons of clarity of the drawings, the elements corresponding to two check points only have been shown.

They are contained inside rectangles 11–1 and 11–2 whereas the temperature index setting means common to all the check points are contained in a rectangle 4.

There will merely be described the bridge constituted by certain elements of the blocks 4 and 11–1, which is sufficient for understanding the invention.

As can be seen, this bridge comprises four resistors, namely: two resistors 5 and 7 on each side of a potentiometer 6; a heat responsive probe 12–1 which constitutes a resistance which is variable as a function of the temperature prevailing at the first check point; a calibrated resistor 13–1 in series with the probe 12–1.

There is applied to the terminals of the potentiometer arm 5–6–7 a voltage constituted by a succession of square positive pulses having a repetition frequency double that of the A.-C. line supply for the circuit. This pulse voltage is produced from the line voltage applied to the terminals 1–2 by a generator 3 which has an input 3b controlling the phase difference between the line voltage and the pulse voltage, as will be explained in detail hereinafter.

Preferably, the generator 3 also produces a pulse voltage $h'$ synchronized with $h$.

The measuring arm corresponding to the first check point comprises an operational amplifier 14–1 having an input connected to the point common to the resistors 12–1 and 13–1 and another input connected to the slider of the potentiometer 6 through an impedance matching device 8.

The output of the operational amplifier 14–1 is connected, on one hand, to a threshold transmission circuit discriminating the sign of the error voltage 15–1 and, on the other hand, to a breakdown detecting and signalling means 18–1 whose function will be explained hereinafter.

The discriminator circuit 15–1 receives, as can be seen, the pulse voltage $h'$. Its output is connected to a static switching means 16–1 connected in series with a heating resistance 17–1 which regulates the temperature at the first check point.

In a particularly interesting application of the invention, the circuitry just described serves to control the active voltage of different threads which pass through tubular elements. Each of these elements is therefore provided with a heating resistance, such as 17–1, 17–2, etc., and a heat responsive probe, such as 12–1, 12–2, etc.

The heat responsive probes are, for example, constituted by a platinum wire having a positive temperature coefficient and the switching means 16–1, 16–2, etc. are constituted by an electronic device having the characteristic of a thyratron. The control electrode of this device is connected to the output of the discriminator circuit 15–1.

In operation, the working temperature is set by regulating the potentiometer 6.

The impedance matching circuit is an amplifier 8 having a voltage gain of unity and has practically zero output impedance (at terminal 10). Consequently, even when a large number of measuring channels are connected to this terminal, the set potential prevailing therein (and therefore, the control point) is not substantially modified by the flow in said channels. In other words, there is no mutual reaction between the various measuring channels. This important result is obtained, owing to this feature of the circuit, with no need to pass a high current through the potentiometer. Therefore, there is low consumption and a low power potentiometer can be employed.

The deviation between the temperature prevailing at the considered measuring point and the required or index temperature, set by the adjustment of the potentiometer 6, results in an error voltage, which is positive or negative depending on the sign of this deviation, between the terminals of the operational amplifier 14–1. This amplifier performs the function of amplifying the error voltage and has the advantage of having a very high input impedance, which still further reduces the interactions between the measuring channels.

The error voltage is in the form of a pulse voltage, and this error voltage is in phase with the voltage applied to the terminals of the potentiometer arm when the temperature is too low and in phase opposition when the temperature is too high.

The switch means 16–1 is a power switching component having a thyratron characteristic.

Preferably, it is a bidirectional component and advantageously the component known under the name of "triac." However, it could be replaced by two thyristors connected in opposed relation or by two Shockley diodes connected in opposed relation and controlled by voltage pulses.

By way of a modification, it is possible to employ a thyratron or a thyristor constituting the diagonal of a diode bridge, actuation then being effected through a pulse transformer or a thyratron (or thyristor) supplied by an unfiltered, rectified double alternating voltage or a thyratron (or thyristor) fed by a rectified monoalternating voltage. In the latter case, the repetition frequency of the chopped voltages must equal that of the A.C. supply line.

The invention is not intended to be limited to these various examples.

Figure 2:
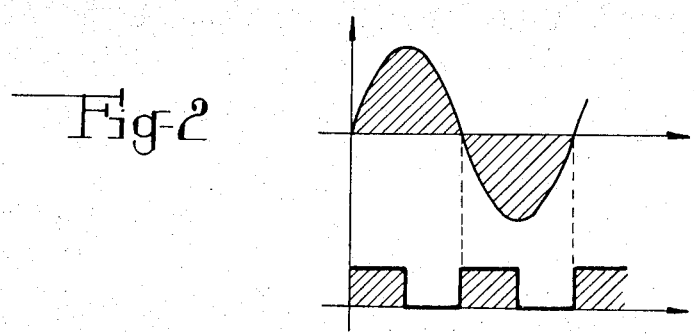
FIGS. 2–4 show waveforms illustrating the operation of such a device.
Figure 3:
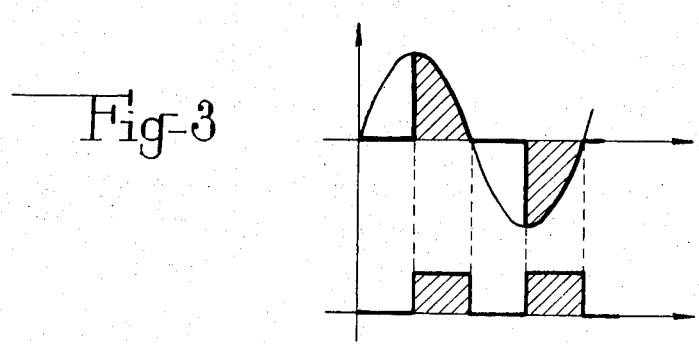
Figure 4:
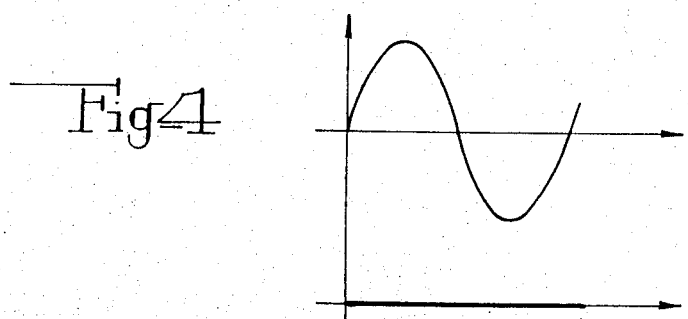

The conduction times of the switch means 16–1 can take one of the forms shown in FIGS. 2, 3 and 4.

FIG. 2 corresponds to the time taken to start up the machine during which an accelerated heating of the nozzles is necessary.

The phase difference between the pulse voltage and the voltage of the power line is then regulated to be zero through the terminal 3a in a manner indicated hereinafter.

As can be seen in FIG. 2, in which the cross-hatched portions of the A.C. heating voltage correspond to the conducting state of the means 16–1, this conducting state is then permanent.

As soon as the lower temperature threshold is reached, the aforementioned phase difference is changed to another predetermined value, for example 90°. This is shown in FIG. 3. It can be seen that the conducting state of the means 16–1, 16–2, etc., and consequently the heating of all the rods, is maintained during half the time (normal heating).

As soon as the required or index temperature is exceeded at a given check point, for example the first check point, the error voltage at 50 becomes negative. At this moment, the voltage $h'$ applied to the discriminator means 15–1 is in phase opposition to the error voltage. Now, the means 15–1 is designed, as will be seen hereinafter, in such manner as to inhibit the transmission of the error voltage to the means 16–1 when this phase opposition exists. Consequently, the heating is then cut off (FIG. 4). When the temperature redescends below the index temperature, the error voltage becomes positive again and the means 15–1 allows through the error voltage and the normal heating is resumed.

The temperature prevailing at each of the check points is finally controlled by an all or nothing method in a manner independent of the corresponding control at the other check points. This control, which is carried out simultaneously for all the points, stabilizes the temperature within a common range which corresponds for example to a tolerance of ±5° C., with respect to the set or index temperature.

Further, in addition to this control the described device includes means detecting and signalling temperautre defects such as 18–1, 18–2, etc.

Indeed, as soon as the temperature at a check point becomes outside the range, the corresponding detecting means lights up an indicator lamp and cuts off the heating of the defective rod, by means, for example, of a bistable electromechanical relay comprising a switch connected in series between the means 16–1 and the heating resistance 17–1, as will be explained hereinafter.

When the temperature becomes outside the range, this signifies indeed that the control device has not operated correctly. It is therefore of utility to provide safety means ensuring a temporary cutting off of the heating independent of that which intervenes for overshooting of the index temperature as a result of the operation of the control device itself. The operator is informed by the indicator lamp that the heating has been cut off and, without stopping the machine, he can replace the control unit, for example 11–1, in which the defect has occurred.

In contradistinction to known devices which comprise a cyclic inspection of the different check points, the device described does not have the drawback of resulting in a general breakdown of the machine for a single defect of even short duration.

Moreover, supplying the multiple bridge with a unidirectional chopped voltage eliminates the problems due to the drift of operational amplifiers and, furthermore, provides directly at their output pulses whose sign is easy to discriminate and which have a frequency suitable for controlling switching means having a thyratron characteristic (the control of these means by a D.C. voltage would require considerable power in the case of a large number of channels).

As explained hereinbefore, the circuit has been designed to avoid any interaction between the measuring channels.

The use of two synchronous chopped voltages $h$ and $h'$ contributes still further to this result.

In practice, the descriminator means 15–1 comprises, for example, a differentiator circuit followed by a threshold circuit which is followed by a discriminator circuit proper, for example simply constituted by two cascaded transistors furnishing a brief pulse for a well-determined direction of the deviation, and, lastly, shaping circuits for this pulse.

Error pulses issuing from the operational amplifier 14–1 are therefore excessively differentiated (to give two pulses of opposite signs corresponding to the two edges of each pulse) and then transmitted to the discriminator circuit proper only when they reach a certain threshold.

The signal-shaping circuits which follow the discriminator circuit enable the switching means 16–1 to be suitably supplied. All these pulse-treating circuits are well known.

The differentiator circuit has for function to eliminate the influence of possible drifts of the operational amplifier on the control point.

The discriminator circuit proper could be constituted by a simple AND gate receiving, at one input, the pulses h' and, at its other input, the differentiated error voltage transmitted by the threshold circuit.

The coincidence between the two inputs will therefore occur only when the error pulse voltage and the pulses h' are in phase, that is, for a given sign of the temperature deviation.

Each means detecting the temperature defect, such as 18–1, comprises a differentiator circuit followed by a rectifier, an integrator and a threshold circuit, of types known per se.

The rectifier eliminates the negative pulses issuing from the differentiator circuit and the integrator integrates the positive voltages which are transmitted by the threshold circuit only if their amplitude exceeds the tolerance defined by the range (which corresponds to 5° C. in the considered example).

Such a network of circuits finally furnishes a positive voltage of constant amplitude, irrespective of the direction of the temperature deviation.

Figure 5:
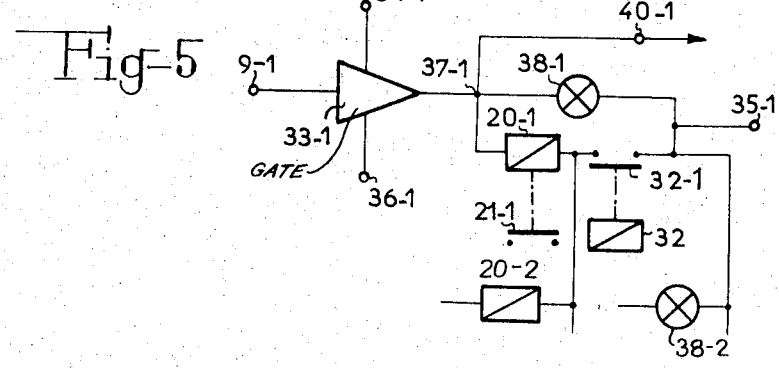
FIG. 5 shows in detail the safety and local signalling circuits included in one of the measuring and control channels, and, FIG. 6 is block diagram of a logic circuit for the central signalling and control in such a device.

This positive voltage controls the relay cutting off the heating and the indicator lamp advantageously in the manner illustrated in FIG. 5. FIG. 5 shows the output terminal 9–1 of the threshold circuit included, as explained hereinbefore, in each temperature defect-detecting means. Following on this threshold circuit is connected a gate 33–1 supplied by a source (not shown) connected between two terminals 34–1 and 35–1 and controlled by the signals applied to the terminal 9.

Each time the temperature is outside the range, namely above or below, the gate 33–1 opens and establishes a low impedance path between two terminals 36–1 and 37–1.

A defect signalling lamp 38–1 and the coil 20–1 of the bistable relay already mentioned are connected in parallel between the terminals 35–1 and 37–1.

Connected between the terminals 35–1 and 36–1 is an auxiliary source (not shown) so that when the gate is open, the lamp 38–1 lights up and the relay 20–1 can be energized, provided, however, that a contact 32–1 of a central safety relay 32, common to all the channels and whose function will be explained hereinafter, is itself closed.

The opening of the gate has moreover for effect to furnish a logic signal of level 1 at a terminal 40–1. The function of this logic signal will be explained hereinafter.

In the preferred embodiment of the invention, the control of the phase difference of the generator 3 is effected automatically by means of logic circuits which furnish a central signalling of any temperature defect and start up and checking of the whole of the device.

Figure 6:
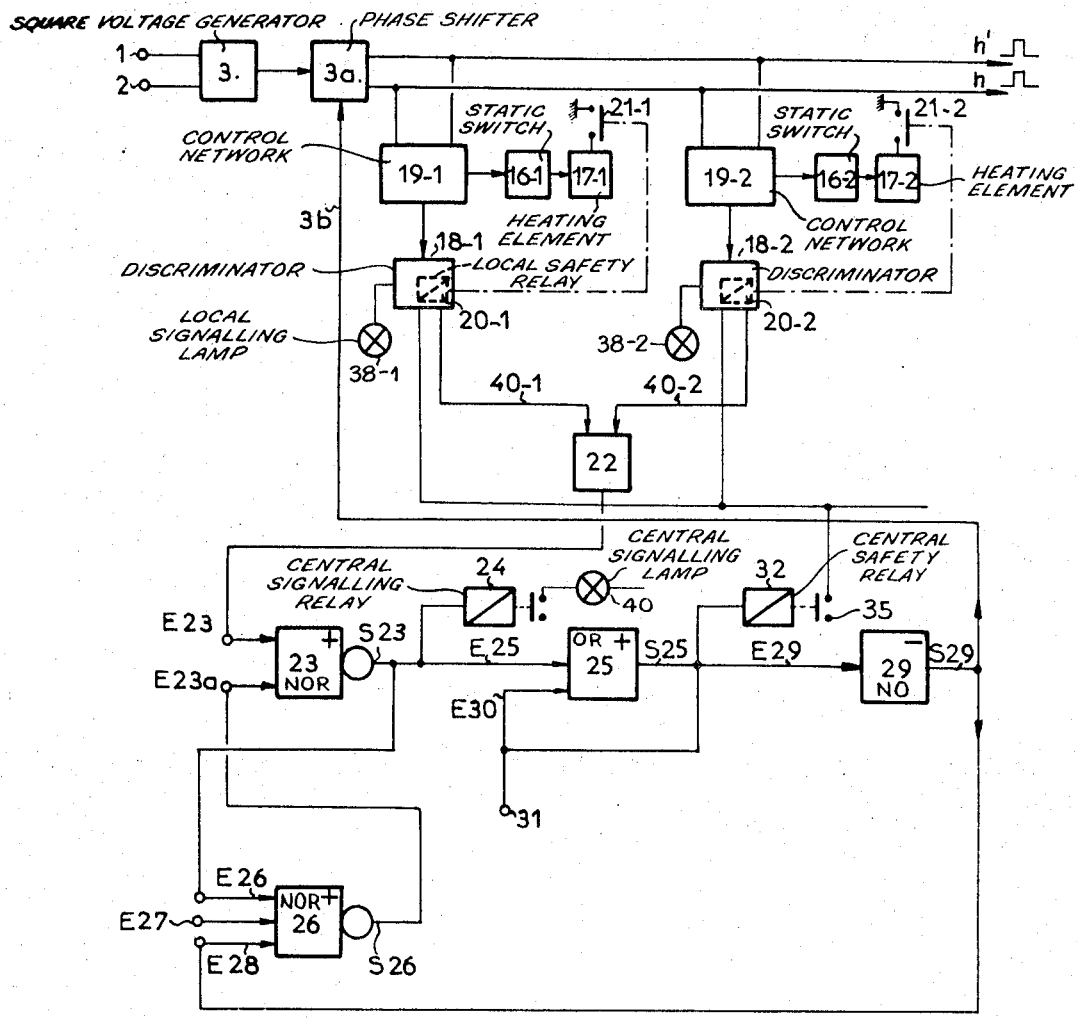

FIG. 6 shows some of the elements shown in FIG. 1 and, moreover, said logic circuits.

It can be seen that the chopped voltage generator 3 is followed by a phase shifter 3a arranged in such manner as to produce zero phase difference when it receives a signal of logic level 1 at a control input 3b, and a phase difference, for example equal to 90°, when this control signal has level 0.

In order to simplify the figure, the elements 12–1, 13–1, 14–1 and 15–1 have been represented generally by a block 19–1 and the elements 12–2, 13–2, 14–2 and 15–2 by a block 19–2.

Further, inside the blocks 18–1, 18–2, there have been represented the aforementioned bistable local safety relays designated by the references 20–1 and 20–2 and which cut off the heating by their opening contacts 21–1 and 21–2 (for example by cutting off the supply to the triac).

The alarm signals produced in the event of a temperature defect at the terminals 40–1, etc. (FIG. 5) are transmitted by an OR gate 22 to an input E23 of a NOR circuit 23, in the form of a logic signal 1 in the event of a defect in at least one of the channels.

As soon as a defect signal appears in at least one channel, the circuit 23 furnishes a signal 0 and actuates a central signalling lamp 40 through a central signalling relay 24.

The output S23 of the circuit 23 is connected to an input E25 of an OR circuit 25 and to an input E26 of a NOR circuit 26 which has two other inputs E27 and N28 and an output S26.

The output S25 of the circuit 25 is connected to the coil 32 of the aforementioned central safety relay and to the input E29 of a NO circuit 29 whose output S29 is connected to the wire 3b and to the input E28.

The input E27 is adapted to receive, as will be explained hereinafter, a signal termed "acquittal" signal and the output S26 is connected to a second input E23 of the circuit 23.

The circuit 25 has moreover, a second input E30 connected to a terminal 31 which is provided for applying a manual control signal and is connected to the output S25.

The circuit shown in FIG. 6 operates in the following manner: when the machine is started up, all the pins are too cold and, consequently, all the terminals 40–1 etc., furnish a signal 1 to the circuit 22 which applies a signal 1 to the input E23. The circuit 23 then applies a signal 0 to the input E25 which applies a signal 0 to the coil 32 and to the input E29.

The application of the signal 0 to the input E29 has for effect to generate a signal 1 at the output S29 and therefore to regulate the phase difference of the generator 3 to the 0 value which produces the accelerated heating.

It should be mentioned that application of the signal 0 to the coil 32 leaves the central safety relay 32 at rest, and therefore opens the contacts 32–1, etc., open, this prevents the local safety relays 20–1, etc. from being supplied and therefore avoids the turning off of the heating by the contacts 21–1, etc., notwithstanding the temperature difference during the accelerated heating.

The temperature rises under the effect of the accelerated heating. As soon as the lower temperature thresholds are all passed through at the different points, the apparatus is made to heat up normally in the following manner; signal 1 is no longer applied to the circuit 22, so that the input E23 is at level 0 and the output S23 at level 1. The output S25 passes to level 1, therefore the output S29 passes to level 0 which acts on the phase shifter 3a in such manner as to change to the normal heating rate.

Moreover, as the coil 32 is this time at level 1, the contacts 32–1, etc. are closed. Consequently, each time a defect occurs in any channel, the local safety relay 20–1 of the defective channel can be energized and the heating turned off.

As the central signalling relay 24 is released, the operator knows that the machine is operating normally.

In the event of a temperature defect (in one direction or the other) in the course of normal operation of the machine, a signal 1 is applied to the input E23 and therefore a signal 0 occurs at the output S23 and actuates the signalling relay 24.

The input E25 passes to level 0 but the output S25 remains at level 1 owing to the fact that the circuit 25 had previously been made self-maintaining by the input E30.

Consequently, normal heating is maintained as before.

The defect is signalled by the central signalling relay 24 to the central checking station.

Further, the circuit 26, in the course of the passage to normal heating, was unlocked by the signal 0 applied to its terminal E28.

It will now produce a signal 1 as soon as its input E26 receives a signal 0 from the terminal S23, that is, as soon as a defect occurs.

In other words, in normal operation, the circuits 23 and 26 perform the function of a bistable device storing the defect. When a defect appears, the operator can then ascertain, by inspecting the lamps 38–1, etc. in which channel the defect occurs and intervene by replacing the electronic circuits which correspond to this channel.

After this intervention, the operator sends by means of a manual device (not shown) a signal 1 to the terminal E27. The signal re-establishes the output S26 and therefore the input E23a, to level 0 which has for effect to render the relay 24 inoperative and therefore to turn off the signal.

If a permanent defect appears in a measuring channel during the accelerated heating period, passage to normal heating will not be produced automatically by the logic circuits (since such a passage is only produced, as seen, by the complete disappearance of the temperature defects in all the channels). If the operator nonetheless desires to operate the machine, he applies by means of a manual device (not shown) a signal 1 to the terminal 31 which has for effect to produce a signal 0 at the output S29 and therefore results in the normal heating rate and actuates the central safety relay 32 and thus ensures normal operation of the safety means in all the other channels.

It must be understood that the invention is not inended to be limited to the diagrams of the safey devices shown FIGS. 5 and 6, although they represent a preferred embodiment of the invention. It is possible in some applications to dispense completely with these devices without modification of the operation of the control network proper.

We claim:

1. A device for measuring and controlling the temperature at a plurality of points comprising a temperature sensitive balanced bridge having a potentiometer arm for setting the index temperature common to all the points, and as many measuring arms as there are points, said measuring arms being connected in parallel and each comprising a resistor, a heat responsive probe connected in series with the resistor, a source of rectangular wave voltage for the bridge connected across terminals of the potentiometer arm, and a plurality of control networks, each control network comprising amplifier means respectively connected between a slider of the potentiometer and the respective common points of the heat responsive probes and of the resistors of the respective measuring arms for amplifying the error voltage, static switching means having a thyratron characteristic adapted to control the heating a source of A.C. voltage for supplying power to the static switching means, means for conrtolling the phase difference between the rectangular wave voltage and the A.C. voltage, so as to determine the time intervals of conduction of the static switching means, and discriminating means, in each of said control networks for transferring the error voltage from the amplifier means to the control electrode of the static switching means only when said error voltage has a predetermined phase relation to the square wave voltage.

2. A device as claimed in claim 1, wherein said means for controlling the phase difference provide at least one first phase different value which corresponds to an accelerated heating rate and a second phase difference value which corresponds to a normal heating rate.

3. A device as claimed in claim 2, wherein the first phase difference is nil, and the second phase difference value is 90°.

4. A device as claimed in claim 1, wherein said means for controlling the phase difference are adapted for passing automatically from the accelerated heating rate to the normal heating rate when, after a period of starting up, all the points have reached a predetermined lower temperature threshold value.

5. A device as claimed in claim 4, comprising a local signalling network adapted to signal a defect in the control connected in parallel with each one of the control networks and comprising means for interrupting the heating when such a defect occurs, the device further comprising a central signalling and control logic circuit connected to actuate a central signalling means signalling a control defect in any one of the measuring channel wherein said logic circuit comprises a first OR circuit having inputs connected to the various local signalling networks, a first NOR circuit connected to an output of the first OR circuit, a second OR circuit connected to an output of the first NOR circuit, and a NO circuit connected to an output of the second OR circuit, the output of the first NOR circuit controlling, the central signalling means, the output of the second OR circuit controlling a safety relay which controls a plurality of contacts connected in series with the respective local signalling networks for interrupting the heating whereby said means are put out of action during said period of starting up and the output of the NO circuit furnishing a control signal to said means controlling the phase difference.

6. A device as claimed in claim 5, comprising a second NOR circuit having an input connected to an output of the first NOR circuit, an input connected to an second input of the first NOR circuit, whereby said second NOR circuits forms with the first NOR circuit flip-flop which is unlocked by said control signal and thus serves to store a control defect which occurs in any one of the measuring channels.

7. A device as claimed in claim 6, wherein the second NOR circuit has a third input adapted to allow an operator to apply a signal which erases the storage of the defect and eliminates the central signalling.

8. A device as claimed in claim 7, wherein the second OR circuit has a self-supply input connected to its output and capable of receiving moreover a signal applied by an operator, said operator-applied signal being capable of causing passage to the normal heating rate when permanent temperature defect occurs in any measuring channel during the starting up period.

9. A device as claimed in claim 1, wherein the said discriminating means include an AND gate having a first input on which the rectangular wave voltage is applied and a second input on which the error voltage is applied.

10. A device as claimed in claim 9, wherein the said discriminating means further include a differentiator circuit having an input to which the error voltage is applied.

References Cited

UNITED STATES PATENTS

| | | | |
|---|---|---|---|
| 3,166,246 | 1/1965 | Fielden | 219—499 X |
| 3,290,486 | 12/1966 | Mordwinkin | 219—499 |
| 2,820,217 | 1/1958 | Sperry et al. | 340—233 X |
| 3,304,441 | 2/1967 | Pelt | 340—233 X |
| 3,322,933 | 5/1967 | Harnden et al. | 219—499 X |
| 3,377,545 | 4/1968 | Tveit | 219—499 X |
| 3,476,914 | 11/1969 | Cussen | 219—499 |

DAVID L. TRAFTON, Primary Examiner

U.S. Cl. X.R.

219—499, 506; 340—233